United States Patent
Meyer-Salfeld et al.

(10) Patent No.: US 11,371,531 B2
(45) Date of Patent: Jun. 28, 2022

(54) COMPRESSOR FOR CHARGING A COMBUSTION ENGINE

(71) Applicant: BorgWarner Inc., Auburn Hills, MI (US)

(72) Inventors: Steffen Meyer-Salfeld, Leonberg (DE); Rolf Sauerstein, Finkenbach-Gersweiler (DE); Iago Gonzalez, Vigo (ES)

(73) Assignee: BorgWarner Inc., Auburn Hills, MI (US)

( * ) Notice: Subject to any disclaimer, the term of this patent is extended or adjusted under 35 U.S.C. 154(b) by 7 days.

(21) Appl. No.: 16/817,891

(22) Filed: Mar. 13, 2020

(65) Prior Publication Data

US 2020/0291958 A1 Sep. 17, 2020

(30) Foreign Application Priority Data

Mar. 15, 2019 (EP) .................................... 19163149

(51) Int. Cl.
*F04D 29/42* (2006.01)
*F04D 29/68* (2006.01)
(Continued)

(52) U.S. Cl.
CPC ....... *F04D 29/4213* (2013.01); *F04D 29/685* (2013.01); *F02B 37/00* (2013.01);
(Continued)

(58) Field of Classification Search
CPC .... F04D 29/4213; F04D 29/685; F04D 17/10; F02M 26/06; F02M 26/19; F02M 26/70;
(Continued)

(56) References Cited

U.S. PATENT DOCUMENTS 4,497,335 A * 2/1985 Masuda ................. F02M 26/55
123/568.29
7,017,560 B2 * 3/2006 Eriksson ................. F02M 26/06
123/568.12
(Continued)

FOREIGN PATENT DOCUMENTS

DE 112006003468 T5 11/2008
GB 2526594 A 12/2015

OTHER PUBLICATIONS

English language abstract for DE 11 2006 003 468 extracted from espacenet.com database on Apr. 23, 2020, 1 page.

*Primary Examiner* — Shafiq Mian
(74) *Attorney, Agent, or Firm* — Howard & Howard Attorneys PLLC

(57) ABSTRACT

Compressor for charging a combustion engine, comprising a compressor housing (1) with a volute (2), a compressor wheel (3) being arranged in the compressor housing (1), the compressor wheel (3) turning about an axis (A) and transporting gas into the volute (2), and an inlet channel (4), at least an end portion of the inlet channel (4) being oriented in the direction of the axis (A) in order to direct gas towards the compressor wheel in the axial direction, wherein an exhaust gas channel (5) terminates into the inlet channel (4) upstream of the compressor wheel (3), and wherein the exhaust gas channel (5) can be shut off by means of a valve (6), wherein a housing (8) of a driving device (7) of the valve (6) is integrally formed with the compressor housing (1).

20 Claims, 3 Drawing Sheets

(51) Int. Cl.
*F04D 17/10* (2006.01)
*F02M 26/06* (2016.01)
*F02M 26/19* (2016.01)
*F02B 37/00* (2006.01)
*F02C 6/12* (2006.01)

(52) U.S. Cl.
CPC ............... *F02C 6/12* (2013.01); *F02M 26/06* (2016.02); *F02M 26/19* (2016.02); *F04D 17/10* (2013.01); *F05D 2220/40* (2013.01); *F05D 2250/51* (2013.01); *F05D 2270/101* (2013.01)

(58) Field of Classification Search
CPC ........ F02B 37/00; F02C 6/12; F05D 2220/40; F05D 2250/51; F05D 2270/101
USPC ......... 60/605.2; 123/568.11–568.12, 568.18, 123/568.23; 251/308, 129.11; 701/108
See application file for complete search history.

(56) References Cited

U.S. PATENT DOCUMENTS

| | | | | |
|---|---|---|---|---|
| 8,047,184 B2* | 11/2011 | Styles | .................... | F02M 26/25 123/568.12 |
| 8,925,530 B2* | 1/2015 | Bruggesser | ............ | F02M 26/11 123/568.18 |
| 9,181,828 B2* | 11/2015 | Vigild | .................... | F02M 26/06 |
| 9,518,537 B2* | 12/2016 | Lallemant | ............. | F02M 26/71 |
| 2006/0081228 A1* | 4/2006 | Keefover | ................ | F02M 26/54 123/568.23 |
| 2007/0144170 A1* | 6/2007 | Griffith | .................. | F02M 26/06 60/605.2 |
| 2008/0223038 A1* | 9/2008 | Lutz | ....................... | F02M 26/06 60/605.2 |
| 2009/0165756 A1 | 7/2009 | Shieh et al. | | |
| 2011/0048004 A1* | 3/2011 | Leroux | .................. | F02M 26/06 60/605.2 |
| 2011/0061380 A1* | 3/2011 | Leroux | .................. | F02M 26/06 60/605.2 |
| 2013/0195628 A1* | 8/2013 | Keefover | ............... | F02M 26/06 415/146 |
| 2015/0068503 A1 | 3/2015 | Wu et al. | | |
| 2015/0247465 A1* | 9/2015 | Telep | ..................... | F02M 26/70 123/337 |
| 2015/0300298 A1* | 10/2015 | Mellere | .................. | F02M 26/70 251/129.11 |
| 2015/0345644 A1* | 12/2015 | Dominguez | ........... | F02M 26/70 251/308 |
| 2018/0328318 A1* | 11/2018 | Kuske | .................... | F02M 26/70 |
| 2019/0128426 A1* | 5/2019 | Abouelleil | ............. | F16K 1/2265 |
| 2020/0300123 A1* | 9/2020 | Newman | ............. | F04D 29/4213 |

\* cited by examiner

COMPRESSOR FOR CHARGING A COMBUSTION ENGINE

FIELD OF THE INVENTION

The invention relates to a compressor for charging a combustion engine.

TECHNICAL BACKGROUND

DE 11 2006 003 468 T5 describes a compressor with a valve for exhaust gas recirculation (EGR-valve) and a mixing device. The EGR-valve is only shown schematically. The exhaust gas streams along a circular path in a volute about an axis of a compressor wheel. Along its circular path in the volute, the exhaust gas stream can successively enter an inlet channel of the compressor by passing a ring-shaped opening radially inwards, the inlet channel being arranged collinear with the axis of the compressor wheel.

It is the object of the invention to provide a compressor for charging a combustion engine, wherein an exhaust gas recirculation is integrally formed with the compressor and an EGR valve works reliably.

SHORT SUMMARY OF THE INVENTION

For a compressor for charging a combustion engine as referred to in the beginning, this object is achieved according to the invention by the features of the characterizing part of claim 1.

By means of integrally forming the housing of the driving device of the valve with the compressor housing, it is achieved that the mechanics for driving the valve are safely and precisely positioned.

Furthermore, the integral forming allows for a compact and space saving design of the entire compressor. Even more, the number of parts to be assembled can be reduced.

A compressor in the sense of the present invention relates to any compressor for charging a combustion engine. Particularly preferred, the compressor wheel can be driven by means of an exhaust gas turbine, the compressor being part of a turbocharger. Alternatively, the compressor wheel could be driven by means of an electric motor, or by other driving means.

By means of the inlet channel, fresh air or any suitable gas is led to the compressor wheel. The air or gas is then compressed by the compressor. Downstream of the compressor, the air or gas is fed to an intake system of the combustion engine.

By means of the exhaust gas channel terminating into the inlet channel upstream of the compressor wheel, a selectable recirculation of exhaust gas of the combustion engine can be added to the air or gas of the inlet channel upstream of the compressor wheel. The amount of added exhaust gas can be adjusted by means of the valve. The valve can have the function of the EGR-valve of an exhaust gas recirculation system known in the art.

The housing of the driving device and the compressor housing can generally consist of separate parts which are assembled to form an integral unit.

In a particularly preferred embodiment of the invention, the compressor housing and the housing of the driving device are provided as one piece, in particular as a cast part. This comprises also embodiments with a first part of the compressor housing and a first part of the housing of the driving device being provided as one piece.

Generally preferred, the valve can comprise a slider, which is moveable in a linear direction, or a valve body/valve flap, which can be rotated by a rotatable shaft. A combination of both principles is within the scope of the invention as well.

In order to provide for an effective and space saving construction, the valve preferably comprises a slider or a shaft of a valve body, wherein a direction of movement of the slider or a direction of an axis of rotation of the shaft has an angle of at least 30°, preferably at least 60°, with the axis of the compressor wheel. Most preferred, the slider or shaft is oriented essentially perpendicular to the axis of the compressor wheel.

In a generally preferred embodiment of the invention, the exhaust gas channel terminates into the inlet channel by means of at least a first orifice, wherein a projection of the orifice in a main streaming direction of exhaust gas has an area focus, the area focus having a radial offset with respect to the axis of the compressor wheel in the main streaming direction of the exhaust gas. Such arrangement allows for an optimization of the fluid dynamics of the gases to be mixed.

In this respect, it can be beneficial if the exhaust gas and the fresh air are mixed as little as possible before they enter the compressor. Such low mixing dynamics can prevent unwanted condensation of corrosive liquid from the exhaust gas, as the exhaust gas is usually cooled down when being mixed with the fresh air from the inlet channel.

It is pointed out that an arrangement as described in the above cited prior art DE 11 2006 003 468 T5 provides for a maximized mixing of exhaust gas and fresh air before entering the compressor. In this arrangement, a ring shaped orifice is arranged mostly essentially tangential to the main streaming direction of the exhaust gas. Hence the area of this orifice in the main streaming direction of the exhaust gas is zero, and has no defined area focus.

In a further optimized embodiment of the invention, the radial offset is greater than 2%, preferably greater than 5%, and more preferably between 5% and 50%, of a nearby diameter of the inlet channel upstream of the orifice.

In the case of a particularly preferred embodiment of the invention, the exhaust gas channel further terminates into the inlet channel by means of a second orifice, the second orifice being arranged at the end of a branched channel that has branched out from the exhaust gas channel. By this design, an unwanted early mixing of the exhaust gas and the air of the inlet channel can further be reduced.

In order to optimize the fluid dynamics of such embodiment, the branched channel can be extending about a circumference of the inlet channel by more than 30°, in particular between 30° and 210°.

In the case of a further preferred embodiment, a gas stream of the first orifice and a gas stream of the second orifice enter the inlet channel in about opposite directions, wherein the gas streams compensate for a respective tilting momentum enacted upon the compressor wheel. Such design minimizes unwanted forces affecting the compressor wheel by the added exhaust gas.

In a generally preferred embodiment of the invention, a heating device can be provided for a heating of the valve. Such heating device can in particular be activated in a cold start situation, as modern exhaust gas recirculation is activated very early or immediately with the start of the combustion engine. In such situation, the water content of the exhaust gas could cause a blocking of the valve due to icing, which can be prevented by means of the heating device.

In one specific embodiment, the heating device can comprise a channel for a heating fluid, in particular an engine coolant. Alternatively or as an addition, the heating device can comprise an electrical heating.

Further advantages and features of the invention are described in the embodiments of the invention described below as well as in the dependent claims.

Two preferred embodiments of the invention are described hereinafter and are further explained by means of the enclosed drawings.

SHORT DESCRIPTION OF THE DRAWINGS

DETAILED DESCRIPTION OF A PREFERRED EMBODIMENT

Figure 1:
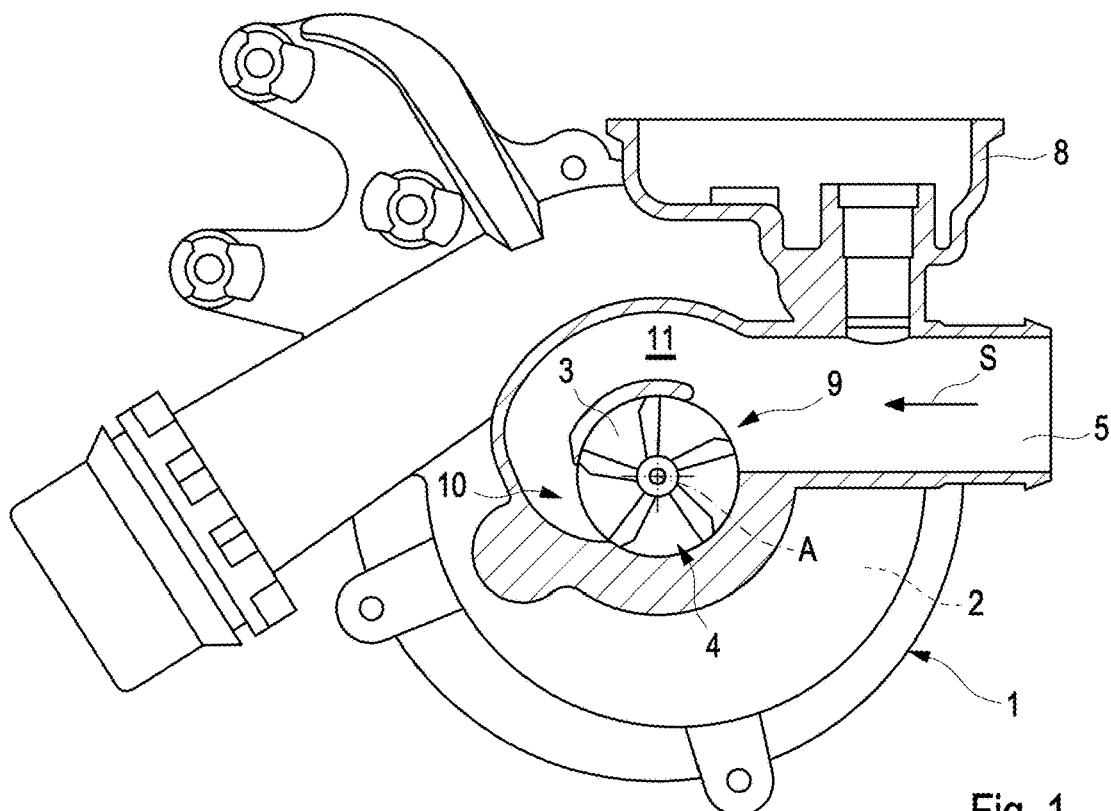
FIG. 1 shows a spatial and partially sectional view of a compressor according to a first embodiment of the invention.

The device in FIG. 1 shows a compressor according to the invention. The compressor is designed for charging a combustion engine. The compressor comprises a compressor housing 1 with a volute 2. A compressor wheel 3 is arranged in the compressor housing 1. During operation, the compressors wheel 3 is turning about an axis A and transporting gas into the volute 2.

Figure 2:
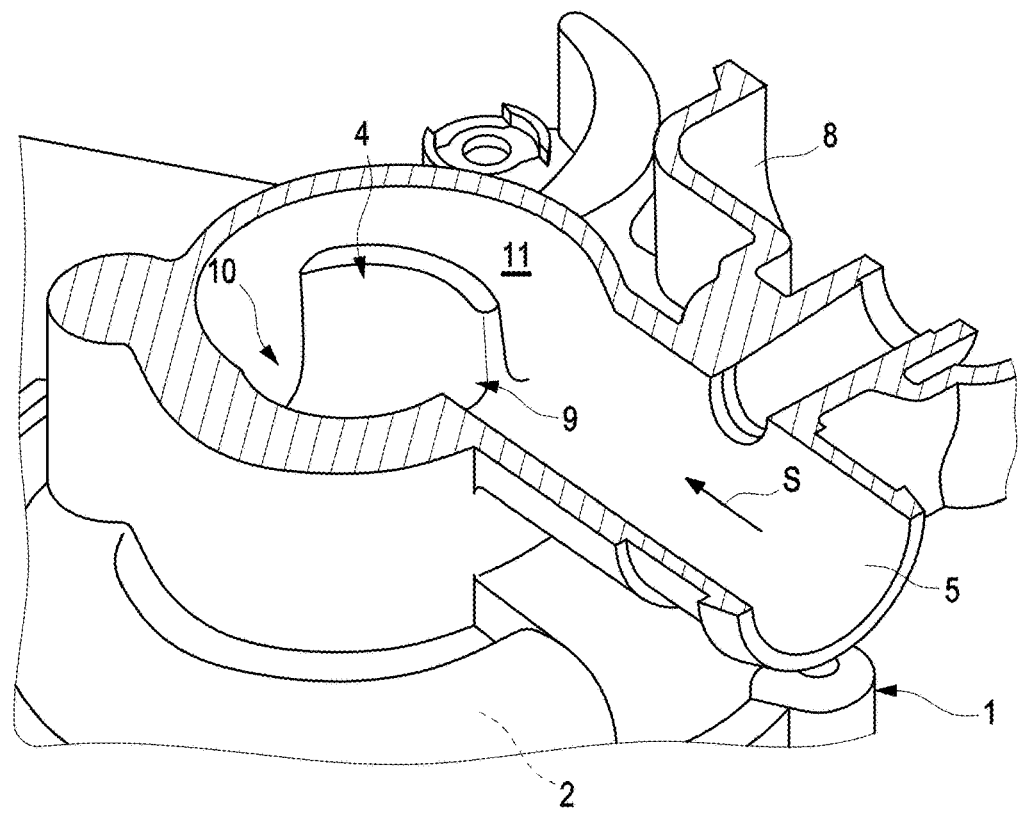
FIG. 2 shows a detail of the compressor of FIG. 1 from a different perspective.
Figure 3:
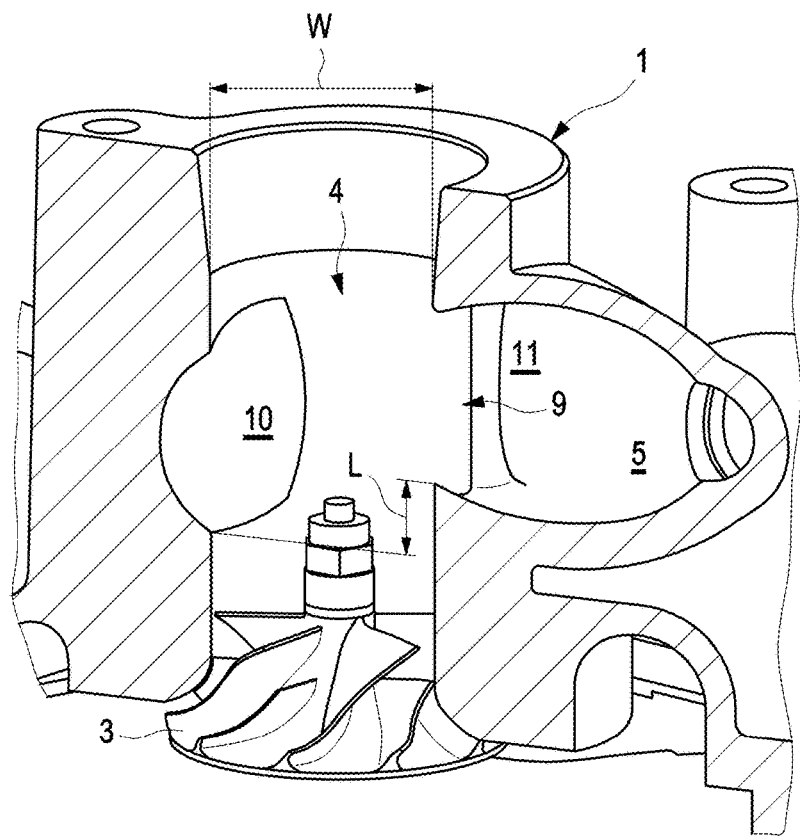
FIG. 3 shows a further detail of the compressor of FIG. 1 from a different perspective.

An inlet channel 4 is oriented in the direction of the axis A in order to direct gas towards the compressor wheel 3 in the axial direction A. In FIG. 1-FIG. 3, the entire shown inlet channel 4 is a straight tube section, but in other embodiments the inlet channel can have various forms, whilst at least an end portion of the inlet channel will be directed towards the compressor wheel in the axial direction.

An exhaust gas channel 5 terminates into the inlet channel 4 upstream of the compressor wheel 3. A valve 6 is provided in the exhaust gas channel 5, wherein the exhaust gas channel 5 can be shut off by means of the valve 6.

Figure 5:
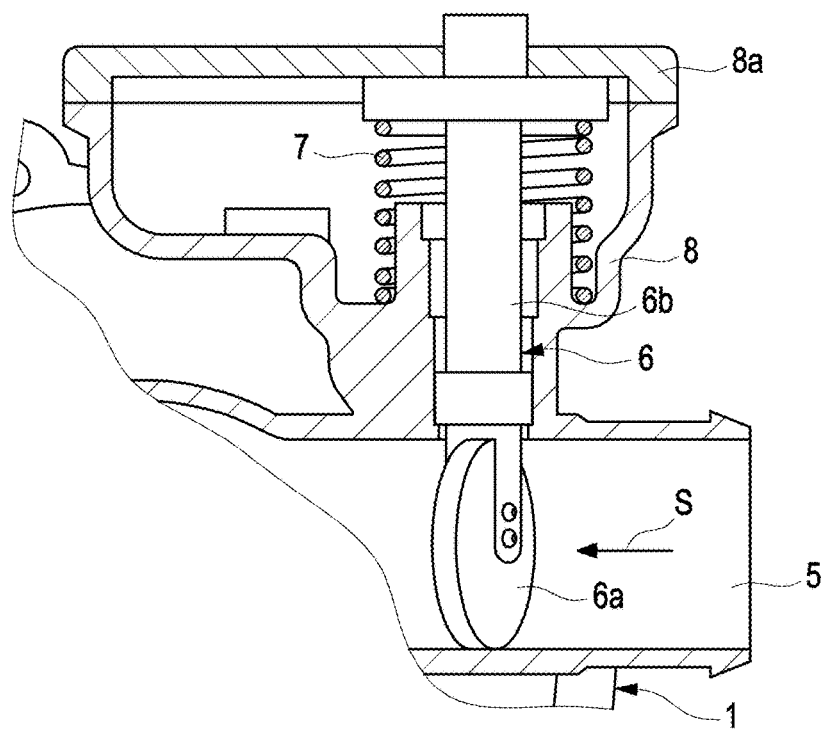
FIG. 5 shows a detail of the compressor of FIG. 1 with a valve and a driving device.

The valve 6 has a driving device 7 (see FIG. 5, FIG. 6) for changing the opening state of the valve 6. A housing 8 of the driving device 7 of the valve 6 is integrally formed with the compressor housing 1.

By means of integrally forming the housing 8 of the driving device 7 of the valve 6 with the compressor housing, it is achieved that the mechanics 8 for driving the valve are safely and precisely positioned. Furthermore, the integral forming allows for a compact and space saving design of the entire compressor. Even more, the number of parts to be assembled can be reduced.

The compressor as shown in FIG. 1 is a compressor for charging a combustion engine. The compressor wheel is driven by means of an exhaust gas turbine (not shown), the compressor being part of a turbocharger. In alternative embodiments, the compressor wheel 3 could as well be driven by means of an electric motor, or by other driving means.

By means of the inlet channel 4, fresh air or any suitable gas is led to the compressor wheel 3. The air or gas is then compressed by the compressor 2, 3. Downstream of the compressor, the air or gas is fed to an intake system of the combustion engine (not shown).

By means of the exhaust gas channel 5 terminating into the inlet channel 4 upstream of the compressor wheel 3, a selectable recirculation of exhaust gas of the combustion engine can be added to the air or gas of the inlet channel 4 upstream of the compressor wheel 3. The amount of added exhaust gas can be adjusted by means of the valve 6. The valve 6 has the function of the EGR-valve of an exhaust gas recirculation system known in the art.

The housing 8 of the driving device 7 and the compressor housing 1 form an integral unit. In the present embodiment of the invention, the compressor housing 2 and the housing 8 of the driving device 7 are provided as one piece, and as a cast part. It is noted that the housing 8 further comprises a cap 8a, and the compressor housing 2 can also comprise further parts to be attached (not shown).

In case of the present embodiment, the valve 6 comprises a valve body 6a in the form of a valve flap. The valve flap 6a can be rotated by a rotatable shaft 6b. The shaft 6b is precisely supported in a bore connecting the exhaust gas channel 5 with the inner of the housing 8 of the driving device 7. This precise support provides for a precise position and movement of the valve body 6a.

In order to provide for an effective and space saving construction, a direction of an axis of rotation of the shaft 6b has an angle of at least 30°, preferably at least 60°, with the axis A of the compressor wheel 3. In the present embodiment, the shaft 6b is oriented essentially perpendicular to the axis A of the compressor wheel 3.

The exhaust gas channel 5 terminates into the inlet channel 4 by means of a first orifice 9, wherein a projection of the orifice 9 in a main streaming direction S of exhaust gas has an area focus F, the area focus having a radial offset D with respect to the axis A of the compressor wheel in the main streaming direction S of the exhaust gas. Such arrangement allows for an optimization of the fluid dynamics of the gases to be mixed.

For the present embodiment of the invention, it is beneficial that the exhaust gas and the fresh air are mixed as little as possible before they enter the compressor wheel 3. Such low mixing dynamics prevents unwanted condensation of corrosive liquid from the exhaust gas, as the exhaust gas is usually cooled down when being mixed with the fresh air from the inlet channel.

It is pointed out that an arrangement as described in the above cited prior art DE 11 2006 003 468 T5 provides for a maximized mixing of exhaust gas and fresh air before entering the compressor. In this arrangement, a ring shaped orifice is arranged mostly essentially tangential to the main streaming direction of the exhaust gas. Hence the area of this orifice in the main streaming direction of the exhaust gas is zero, and has no defined area focus.

The radial offset D in the present example of the invention is about 25% of a nearby diameter W of the inlet channel 4 upstream of the orifice 9. Hence the offset D is greater than 2%, even greater than 5%, and between 5% and 50%, of the diameter W of the inlet channel 4.

Figure 4:
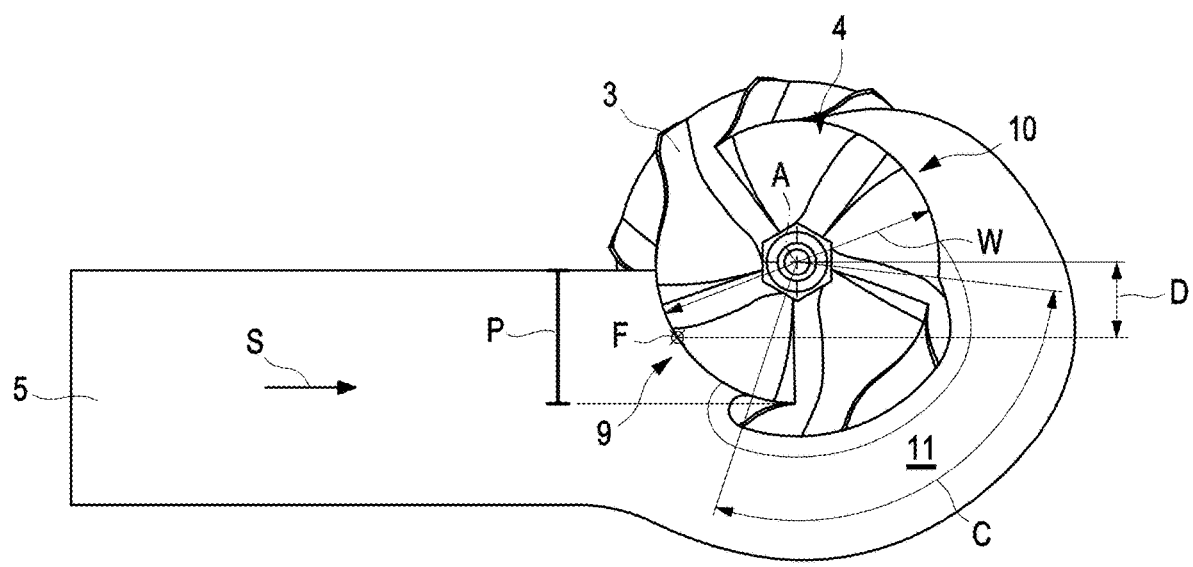
FIG. 4 shows the exhaust gas channel of the compressor of FIG. 1 in a plain view in the direction of an axis of a compressor wheel.

It is noted that in the present design, as can be best seen in FIG. 4, a projection P of the first orifice 9 in the main streaming direction S extends from a line close to crossing a centre of the inlet channel 4 up to a wall of the inlet channel 4. In the sectional view of FIG. 4, P appears as a line, although in fact P is a projected area. It is noted that the size, shape and position of the orifice 9 can differ in other embodiments.

The exhaust gas channel 5 further terminates into the inlet channel 4 by means of a second orifice 10. The second orifice 10 is arranged at the end of a branched channel 11 that has branched out from the exhaust gas channel 5. By this design, an unwanted early mixing of the exhaust gas and the air of the inlet channel can further be reduced.

In order to optimize the fluid dynamics of such embodiment, the branched channel 11 extends about a circumference of the inlet channel 4 by an angle C of about 80°. Hence this angle is more than 30°, and is between 30° and 210°.

By this means, a gas stream of the first orifice 9 and a gas stream of the second orifice 10 enter the inlet channel 4 in about opposite directions, wherein the gas streams compensate for a respective tilting momentum enacted upon the compressor wheel 3. Such design minimizes unwanted forces affecting the compressor wheel 3 by the added exhaust gas.

As can in particular be seen in the detail views of FIG. 3 and FIG. 2, the two orifices 9, 10 have not only different positions in the circumferential direction of the inlet channel 4, but also in the direction of the axis A of the compressor wheel. A rim of the second orifice 10, which is terminating a longer total path of the exhaust gas stream, is located closer to the compressor wheel 3 by a distance L than a corresponding rim of the first orifice 9. The distance L is less than the width W of the inlet channel 4, presently about 25%.

Figure 6:
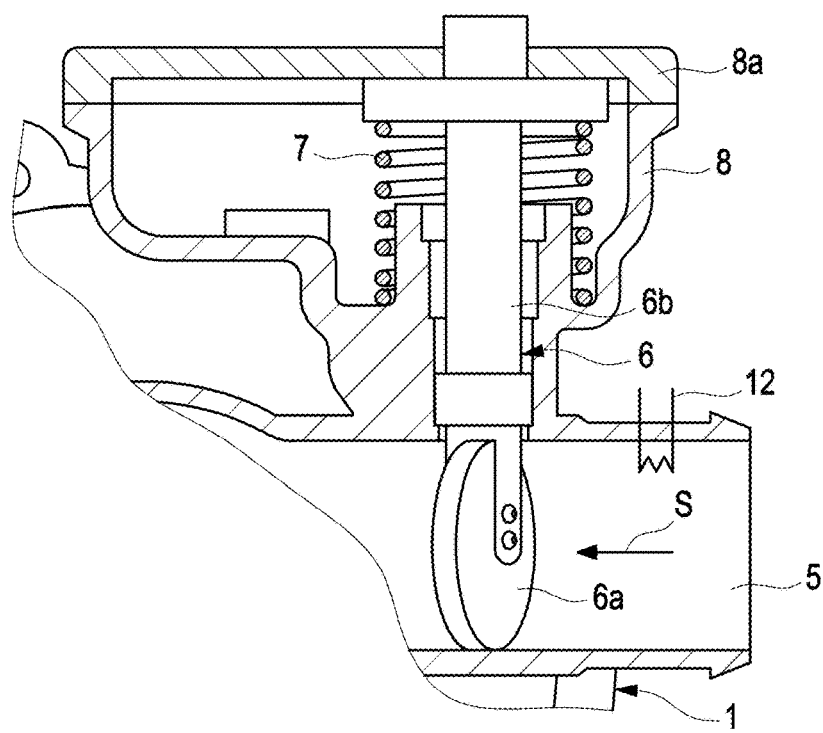
FIG. 6 shows a further detail of the compressor of FIG. 1 from a different perspective.

FIG. 6 shows a schematic view of a second embodiment of the invention. In this embodiment, a heating device 12 is provided for a heating of the valve 6. The heating device 12 can in particular be activated in a cold start situation, as modern exhaust gas recirculation is activated very early or immediately with the start of the combustion engine. In such situation, the water content of the exhaust gas could cause a blocking of the valve due to icing, which can be prevented by means of the heating device.

The heating device as in FIG. 6 comprises an electrical heating. A resistance heating wire is placed close and upstream to the valve 6 in the exhaust gas channel 5. The heating wire is heated with electric current, which provides for a quick warming. In another embodiment (not shown), the heating device can alternatively or additionally comprise a channel for a heating fluid, in particular an engine coolant.

It is understood that the schematically shown electrical heating device 12 and/or any other heating device like a channel for a heating fluid can be designed to heat the exhaust gas upstream of the valve as well as the material of the exhaust gas channel 5, and/or the valve body 6a, and/or the valve shaft 6b. The effect of any of such heating is to prevent water droplets or condensed water from the exhaust gas being deposited as ice in the vicinity of the valve 6, ensuring a proper mechanical function of the valve even in a cold start situation at temperatures below 0° C.

REFERENCE LIST 1 compressor housing
2 volute of compressor
3 compressor wheel
4 inlet channel
5 exhaust gas channel
6 valve
6a valve flap/valve body
6b shaft of valve body
7 driving device
8 housing for driving device
8a cap of housing
9 first orifice
10 second orifice
11 branched channel
12 heating device
A axis of compressor wheel
C angular length of branched channel
D radial offset
F area focus of first orifice
L distance in axial direction
P projection of first orifice
S main streaming direction of exhaust gas
W diameter of inlet channel

The invention claimed is:

1. A compressor for charging a combustion engine, comprising:
   a compressor housing (1) with a volute (2);
   a compressor wheel (3) being arranged in the compressor housing (1), the compressor wheel (3) turning about an axis (A) and transporting gas into the volute (2); and
   an inlet channel (4), at least an end portion of the inlet channel (4) being oriented in a direction of the axis (A) in order to direct gas towards the compressor wheel in an axial direction;
   wherein an exhaust gas channel (5) terminates into the inlet channel (4) upstream of the compressor wheel (3);
   wherein the exhaust gas channel (5) is able to be shut off by a valve (6);
   wherein a housing (8) of a driving device (7) of the valve (6) being integrally formed with the compressor housing (1);
   wherein the valve (6) further comprises a shaft (6b) of a valve body (6a); and
   wherein a direction of an axis of rotation of the shaft (6b) has an angle of at least 30° or at least 60°, with the axis (A) of the compressor wheel (3).

2. The compressor as claimed in claim 1, wherein the compressor housing (1) and the housing (8) of the driving device (7) are casted in one piece.

3. The compressor as claimed in claim 1, wherein a heating device (12) is provided for a heating of the valve (6).

4. The compressor as claimed in claim 3, wherein the heating device comprises a channel for a heating fluid being an engine coolant.

5. The compressor as claimed in claim 3, wherein the heating device (12) comprises an electrical heating.

6. The compressor according to claim 1, wherein the valve (6) further comprises a slider of a valve body (6a), wherein a direction of movement of the slider has an angle of at least 30° or an angle of at least 60°, with the axis (A) of the compressor wheel (3).

7. A compressor for charging a combustion engine, comprising:
   a compressor housing (1) with a volute (2);
   a compressor wheel (3) being arranged in the compressor housing (1), the compressor wheel (3) turning about an axis (A) and transporting gas into the volute (2); and
   an inlet channel (4), at least an end portion of the inlet channel (4) being oriented in a direction of the axis (A) in order to direct gas towards the compressor wheel in an axial direction;
   wherein an exhaust gas channel (5) terminates into the inlet channel (4) upstream of the compressor wheel (3);
   wherein the exhaust gas channel (5) is able to be shut off by a valve (6);

wherein a housing (8) of a driving device (7) of the valve (6) is integrally formed with the compressor housing (1);

wherein the exhaust gas channel (5) terminates into the inlet channel (4) by at least a first orifice (9);

wherein a projection (P) of the first orifice (9) in a main streaming direction (S) of the exhaust gas has an area focus (F); and wherein the area focus (F) has a radial offset (D) with respect to the axis (A) of the compressor wheel (3) in the main streaming direction (S) of the exhaust gas.

8. The compressor as claimed in claim 7, wherein the radial offset (D) is greater than 2% of a nearby diameter (W) of the inlet channel (4) upstream of the orifice (9).

9. The compressor as claimed in claim 7, wherein the exhaust gas channel (5) further terminates into the inlet channel (4) by a second orifice (10), the second orifice (10) being arranged at the end of a branched channel (11) that has branched out from the exhaust gas channel (5).

10. The compressor as claimed in claim 9, wherein the branched channel (11) is extending about a circumference of the inlet channel (4) by an angle of more than 30°.

11. The compressor as claimed in claim 9, wherein a gas stream of the first orifice (9) and a gas stream of the second orifice (10) enter the inlet channel (4) in opposite directions; and wherein the gas stream of the first orifice (9) and a gas stream of the second orifice (10) compensate for a respective tilting momentum enacted upon the compressor wheel (3).

12. The compressor as claimed in claim 9, wherein the branched channel (11) is extending about a circumference of the inlet channel (4) by an angle of between 30° and 210°.

13. The compressor as claimed in claim 7, wherein the radial offset (D) is between 5% and 50% of a nearby diameter (W) of the inlet channel (4) upstream of the orifice (9).

14. The compressor as claimed in claim 7, wherein the valve (6) further comprises a shaft (6b) of a valve body (6a), wherein a direction of an axis of rotation of the shaft (6b) has an angle of at least 30° or at least 60°, with the axis (A) of the compressor wheel (3).

15. The compressor as claimed in claim 14, wherein the radial offset (D) is greater than 2% of a nearby diameter (W) of the inlet channel (4) upstream of the orifice (9), or wherein the radial offset (D) is between 5% and 50% of a nearby diameter (W) of the inlet channel (4) upstream of the orifice (9).

16. The compressor as claimed in claim 7, wherein the compressor housing (1) and the housing (8) of the driving device (7) are casted in one piece.

17. The compressor as claimed in claim 7, wherein a heating device (12) is provided for a heating of the valve (6).

18. The compressor as claimed in claim 17, wherein the heating device comprises a channel for a heating fluid being an engine coolant.

19. The compressor as claimed in claim 17, wherein the heating device (12) comprises an electrical heating.

20. The compressor according to claim 7, wherein the valve (6) further comprises a slider of a valve body (6a), wherein a direction of movement of the slider has an angle of at least 30° or an angle of at least 60°, with the axis (A) of the compressor wheel (3).

* * * * *